United States Patent
Beall et al.

(10) Patent No.: US 10,479,734 B2
(45) Date of Patent: Nov. 19, 2019

(54) METHOD AND APPARATUS FOR THERMALLY DEBINDERING A CELLULAR CERAMIC GREEN BODY

(71) Applicant: Corning Incorporated, Corning, NY (US)

(72) Inventors: Douglas Munroe Beall, Painted Post, NY (US); Dana Craig Bookbinder, Corning, NY (US); David John Thompson, Savona, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 961 days.

(21) Appl. No.: 14/337,480

(22) Filed: Jul. 22, 2014

(65) Prior Publication Data

US 2015/0050609 A1    Feb. 19, 2015

Related U.S. Application Data

(60) Provisional application No. 61/866,145, filed on Aug. 15, 2013.

(51) Int. Cl.
*C04B 38/00* (2006.01)
*C04B 35/64* (2006.01)
(Continued)

(52) U.S. Cl.
CPC ........ *C04B 35/638* (2013.01); *C04B 33/1305* (2013.01); *C04B 33/32* (2013.01); *C04B 35/195* (2013.01); *C04B 35/478* (2013.01); *C04B 35/565* (2013.01); *C04B 35/6365* (2013.01); *C04B 35/64* (2013.01); *C04B 38/0006* (2013.01); *C04B 38/0012* (2013.01); *C04B 2111/00793* (2013.01); *C04B 2111/343* (2013.01); *C04B 2235/6562* (2013.01);
(Continued)

(58) Field of Classification Search
CPC .............. C04B 38/0006; C04B 35/638; C04B 38/0012
USPC ................ 264/630, 631, 671, 672, 605–609
See application file for complete search history.

(56) References Cited

U.S. PATENT DOCUMENTS

| 4,786,542 A | 11/1988 | Yasuda |
| 4,927,577 A | 5/1990 | Ohtaka |

(Continued)

FOREIGN PATENT DOCUMENTS

| EP | 234887 | 9/1987 |
| EP | 1559878 | 11/2003 |

(Continued)

OTHER PUBLICATIONS

PCT International Searching Authority dated Dec. 8, 2014 PCT/US2014/050466.

*Primary Examiner* — Erin Snelting
(74) *Attorney, Agent, or Firm* — Kurt R. Denniston

(57) ABSTRACT

An apparatus and method for debindering a cellular ceramic green body. The apparatus includes a flow modulation member to selectively restrict circulation of a heated oxygen-containing atmosphere through a top of a cellular core section of the green body. The method includes heating the green body in a circulating oxygen-containing atmosphere while selectively restricting circulation of the atmosphere through the top of the cellular core section of the green body.

10 Claims, 8 Drawing Sheets

(51) Int. Cl.

| | | |
|---|---|---|
| *C04B 35/638* | (2006.01) | |
| *C04B 33/13* | (2006.01) | |
| *C04B 33/32* | (2006.01) | |
| *C04B 35/195* | (2006.01) | |
| *C04B 35/478* | (2006.01) | |
| *C04B 35/565* | (2006.01) | |
| *C04B 35/636* | (2006.01) | |
| *C04B 111/00* | (2006.01) | |
| *C04B 111/34* | (2006.01) | |

(52) U.S. Cl.
CPC .............. *C04B 2235/6584* (2013.01); *C04B 2235/6586* (2013.01)

(56) References Cited

U.S. PATENT DOCUMENTS

| | | | |
|---|---|---|---|
| 5,256,347 A * | 10/1993 | Miyahara | B01D 39/2075 264/40.6 |
| 5,316,710 A | 5/1994 | Tasaki | |
| 7,727,613 B2 * | 6/2010 | Suwabe | B01D 46/0001 428/116 |
| 9,221,192 B2 | 12/2015 | Beall et al. | |
| 2007/0054229 A1 | 3/2007 | Hanzawa | |
| 2008/0116621 A1 | 5/2008 | Brennan | |
| 2009/0011176 A1 * | 1/2009 | Ichikawa | B01D 46/2422 428/116 |
| 2009/0205303 A1 * | 8/2009 | Ichikawa | B01D 46/244 55/522 |
| 2010/0130352 A1 * | 5/2010 | Dabich, II | B01J 20/20 502/400 |
| 2011/0127699 A1 | 6/2011 | Vayansky et al. | |

FOREIGN PATENT DOCUMENTS

| | | |
|---|---|---|
| EP | 1541538 | 6/2005 |
| EP | 2098276 | 2/2009 |
| JP | 2-199067 | 8/1990 |
| WO | 2011066069 | 6/2011 |

* cited by examiner

METHOD AND APPARATUS FOR THERMALLY DEBINDERING A CELLULAR CERAMIC GREEN BODY

This application claims the benefit of priority under 35 U.S.C. § 119 of U.S. Provisional Application Ser. No. 61/866,145 filed on Aug. 15, 2013 the content of which is relied upon and incorporated herein by reference in its entirety.

BACKGROUND

1. Field

Exemplary embodiments of the disclosure relate to the manufacture of ceramic honeycombs, and more particularly to the heating of cellular ceramic green bodies to remove binding constituents therefrom during firing to reaction sinter the green bodies to ceramic honeycombs.

2. Discussion of the Background

Ceramic honeycombs composed of refractory ceramic materials such as cordierite, silicon carbide, aluminum titanate and the like are widely used for the manufacture of catalytic substrates and particulate filters. Such substrates and filters are presently needed for the removal of pollutants such as carbon monoxide, nitrogen and sulfur oxides, unburned hydrocarbons and particulates such as soot from combustion engine exhaust gases or stack gases from industrial combustion processes.

The firing of cellular ceramic green bodies to convert them to ceramic honeycombs first requires the debindering or removal from the bodies of various organic binding or pore-forming constituents. Those constituents are required in the earlier forming stage of manufacture for the shaping of plastic mixtures of ceramic precursor powders and binding constituents into self-supporting green cellular shapes. Shaping is typically by extrusion of the plastic mixtures through honeycomb extrusion dies.

Significant manufacturing difficulties can arise where the green honeycomb shapes comprise more than about 5% by weight of organic constituents such as cellulosic binders and/or pore forming additives such as starch that are combustible. High rates of cracking can be observed in the fired ware if the removal of organic binding and/or pore-forming constituents is not carefully managed. The debindering of large cellular green bodies, such as those used for the production of cordierite particulate filters for treating heavy duty diesel engine exhaust streams is particularly problematic.

The predominant source of cracking during the debindering of cellular ceramic green bodies is thought to be an uncontrolled burning (thermal runaway) of the organics within the cores of the cellular green ware. Such burning generates large thermal gradients in the green ware that in turn produce thermal stresses great enough to cause cracking during debindering.

A number of approaches to address such cracking have been proposed. These include the use of low oxygen debindering atmospheres to reduce organics combustion rates, the use of reduced heating rates during debindering to reduce internal temperature differentials within the bodies, and the use of increasing levels of gas circulation through the cells of the bodies during debindering in order to improve temperature uniformity within the bodies. Nevertheless, significant levels of cracking in fired ceramic honeycombs are still encountered.

SUMMARY

Exemplary embodiments of the present disclosure provide a method for debindering a cellular ceramic green body. Exemplary embodiments of the present disclosure also provide an apparatus for debindering cellular ceramic green bodies.

Additional features will be set forth in the description which follows, and in part will be apparent from the description, or may be learned by practice of the embodiments described herein.

An exemplary embodiment discloses a method for debindering a cellular ceramic green body having a top face and a bottom face with axial honeycomb channels extending between the top face and the bottom face. The method includes heating the green body in a circulating oxygen-containing atmosphere and selectively restricting circulation of the atmosphere through at least a portion of the top face of the cellular ceramic green body.

An exemplary embodiment also discloses an apparatus to debinder a cellular ceramic green body having a top face and a bottom face with axial honeycomb channels extending between the top face and the bottom face. The apparatus includes a kiln having a heating chamber to heat the body, a base support disposed within the heating chamber including spacings configured to allow free circulation of heated oxygen-containing gases past the base support. The base support is configured to accept a cellular ceramic green body. The apparatus includes a flow modulation member to be disposed on the cellular ceramic green body. The flow modulation member is configured to restrict the passage of heated oxygen-containing gases through the top face of the green body. The apparatus also includes a kiln inlet to admit heated oxygen-containing gases into the heating chamber and a circulation unit to circulate the heated oxygen-containing gases past the base support.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate exemplary embodiments described herein, and together with the description serve to explain the principles of the claimed invention.

DETAILED DESCRIPTION OF THE ILLUSTRATED EMBODIMENTS

Figure 1A:
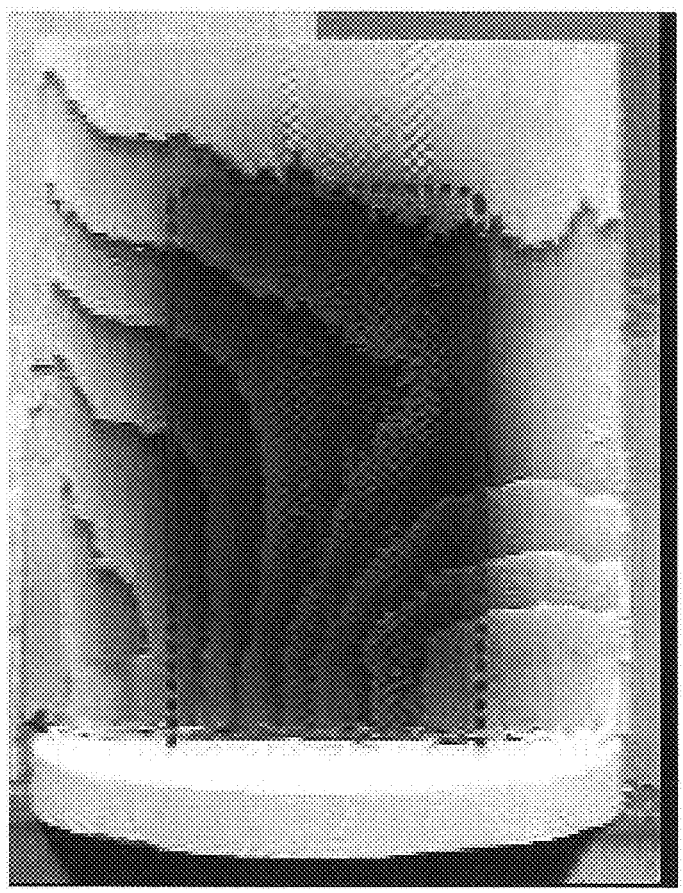
FIG. 1A shows a firing pattern in a Comparative Example part sectioned after partial firing and FIG. 1B shows a firing pattern in a part according to an exemplary embodiment of the disclosure sectioned after partial firing.

The disclosure is described more fully hereinafter with reference to the accompanying drawings, in which embodiments according to the claims are shown. The claims may, however, be embodied in many different forms and should not be construed as limited to the embodiments set forth herein. Rather, these embodiments are provided so that this disclosure is thorough, and will fully convey the scope of the claims to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the methods and apparatus of the present disclosure relate to the debindering of large cellular ceramic green bodies of the kind produced for the fabrication of honeycomb catalyst supports or filters for heavy duty diesel or gasoline combustion engines. A significant share of such honeycomb production consists of refractory, low-expansion cordierite (magnesium aluminosilicate), aluminium titanate, and silicon carbide honeycombs that are formed by the reaction-sintering of plasticized mixtures of clay, talc, alumina and other precursor powders combined with binders such as cellulose ethers and pore formers such as starch or graphite. Exemplary embodiments of the methods and apparatus of the present disclosure may therefore be described below with reference to the debindering of such cordierite cellular green bodies even though the use of such methods and apparatus is not limited thereto.

The present methods and apparatus are well suited for the removal of relatively high levels of organics from cordierite honeycomb bodies. Among the processing variables impacting the effectiveness of the disclosed methods for cordierite honeycomb debindering are the open flow area (open frontal area) of a flow modulation member, the oxygen levels maintained in the kiln, the heating rates employed during debindering, and the kiln atmosphere flow rates used for the circulation of heated oxygen-containing gases over ware being subjected to debindering.

Often, firing cracks may be found in the top face of the honeycomb part. Without wishing to be bound by theory, it is believed that these cracks result from strains associated with the decomposition of cellulose polymers included in the composition as binders and pore-formers. This decomposition occurs in the top face region of the part before decomposition can occur in the interior of the part. Strains are generated from thermal and atmospheric non-uniformity between the top face and the interior of the parts. Both contributions result in shrinkage differences between the top face and the interior.

The top face of the part may be geometrically the weakest region of the part, and cracks typically open across intersections of the channels and extend longitudinally down the extrusion axis. In severe cases, the cracks can extend to the periphery or outer skin of the honeycomb. Resistance to stress in this direction is substantially lower than in perpendicular (radial) directions (i.e., ring-off direction). Thermal gradients may be managed by control of firing rate (change in temperature divided by change in time); however the difference in local atmosphere between the top face and interior is not impacted significantly by change in firing rate. Furthermore, slowing the rate is undesirable since it results in longer time to fire the part which adds cost.

Organic burn off in comparative firing processes is a fast radical chain reaction of difficult to control reaction kinetics and heat management because the ignition process often takes place at the face of large parts where the temperature is the highest and where a higher surface area is exposed to oxygen. The organic burn off process is a self-accelerating reaction, where the heat generated from the oxidation reaction may increase local temperatures and further accelerate the oxidation reaction. Exposed surfaces of the part (skin and top face) are where oxidation begins. Oxygen is consumed at these locations until the organic matter is fully oxidized before oxygen can migrate more deeply into the part. Therefore, the inside of the parts become an oxygen-starved location. The significant non-uniformity of reactions between the top and middle of the parts can cause cracks from the internal stress.

When the bottom of the part is exposed to kiln atmosphere by use of a ring setter, such as disclosed, for example, in published U.S. Patent Application US 2008/0116621, the fast reaction at the top face may consume all of the oxygen surrounding the oxidation sites and generate a flow of oxygen containing atmosphere from the bottom of the part up through the part toward the top of the part, a "chimney effect". A high volume of oxygen may flow from the bottom to the top area of the part and create a temperature spike. Thus, a non-uniformity of reactions across the parts also becomes unavoidable. To slow down the reaction and sudden ignition process at the top face, low oxygen can be used to control the ignition and oxidation rate to improve the firing yield at a cost of prolonging the firing cycle. Moreover, since the thermal decomposition reaction of organics is only a function of temperature for fixed atmosphere, a sudden decomposition of organics could release a large amount of organic vapors, and insufficient oxidation reagents could cause a lower flammability limit (LFL) control issue during the firing process. Recently, we have found that injection of steam into the firing process can significantly improve the firing yield and shorten the firing cycle by changing the reaction kinetics and thermodynamics as described in co-pending U.S. patent application Ser. No. 13/885,271, filed on May 14, 2013, the entire contents of which are hereby incorporated by reference as if fully set forth herein.

Because the part is capped by a flow modulation member in exemplary embodiments of this disclosure, the local environment inside the part has low oxygen. Locations in the parts where cracking can typically occur have low oxygen because of the caps, and a symmetrical and smooth reaction interface is generated to improve the firing yield. In broad general terms, this control of the decomposition and oxidation behavior at locations in the parts can be realized by a flow modulation member disposed at the top of the part to modulate the release of reaction products gases and change the ignition sites from top face of the part to the face of the flow modulation member according to an exemplary embodiment of the disclosure.

Exemplary embodiments disclose a method and apparatus for improving the firing yield of green ceramic honeycomb bodies by covering the ceramic part with a flow modulation member. The top face of the ceramic part may be covered with the flow modulation member or a periphery of the part may be covered. The flow modulation member may be a green "sleeve" or larger honeycomb body having a cavity into which the part can be placed during firing. The flow modulation member may be a (green or fired) honeycomb or a plate to cover the top face of the ceramic part. The flow modulation member may be disposed directly in contact with the part to be fired or separated by a small gap. The flow modulation member may be integral with the part, for example, the cellular ceramic green body may have a portion of the top channels smeared closed by wet channel walls (webs) or filled with material. The oxygen flow to the top green ceramic cells of the part may be restricted by the flow modulation member. This results in reducing or eliminating cracking.

The flow modulation member provides a uniform reaction pattern and maintains the local oxidation sites of the parts with a higher concentration of steam and a lower concentration of oxygen. Thus, a higher yield of crack free parts, i.e., a reduction in the number of defects, can be realized by reducing or eliminating the "chimney effect" or the local self-acceleration reaction process.

Figure 1B:
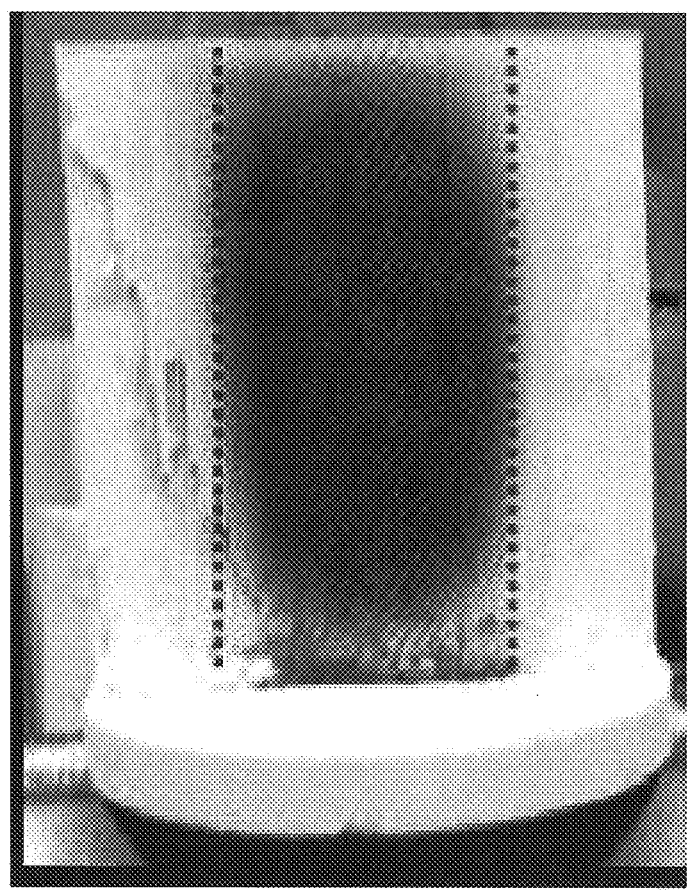

The effectiveness of exemplary embodiments of the disclosed methods and apparatus employing the flow modulation member for the debindering of cellular green bodies is illustrated in FIGS. 1A and 1B of the appended drawings. FIGS. 1A and 1B show cordierite with 200 cells per square inch and 8 mil wall thickness (200/8) 5.66 inch wide by 6 inch long parts (14.376 cm×15.24 cm) partially fired at the same condition of higher steam with low oxygen condition for 12 hours at 400° C. to evaluate the impact of covering the part with a green honeycomb at the top face on the firing pattern. The furnace atmosphere was greater than 80% $H_2O$ (steam) and less than 5% $O_2$ at 1 atmosphere. FIG. 1A shows a Comparative Example of a setup with a green honeycomb at the bottom of the part. FIG. 1B shows an Example according to an exemplary embodiment of the disclosure of a setup with a green honeycomb at the bottom of the part plus a green honeycomb disposed at the top of the part. In the Comparative Example setup of FIG. 1A, both the top and side of the parts become white, indicating the carbon is completely removed, while the bottom of the part is still black. Therefore, the area directly exposed to the reaction gases has been oxidized.

The Comparative Example set up of FIG. 1A created a dome shaped interface (outlined in dashed lines in the Figure) covering on the bottom of the honeycomb. The domed shaped interface in FIG. 1A has low symmetry in the axial direction and changed symmetry in the tangential direction. This creates a considerable interfacial mismatch (shear force) between the top oxidation section and the bottom of the inside core section due to temperature, material, and local atmospheric differences. In contrast, the setup according to an exemplary embodiment of the disclosure as shown in FIG. 1B only exposes the peripheral side (skin) to the oxidation gases where geometric resistance to stress is highest and eliminates the direct exposure of the top surface where geometric resistance to stress is lowest. Thus, a cylindrical interface (outlined in dashed lines in the Figure) is formed from outside of skin to inside core. The cylindrical geometry has higher symmetry at both axial and tangential directions. Thus, a smaller internal stress (interface mismatch) could be generated during the firing process for cracking the parts.

Moreover, the part covered by a top honeycomb or top plate setup prevents an initial light off of parts at the top skin and top core which reduces or prevents the self-acceleration from the "chimney effect" (flow of $O_2$ containing atmosphere from the bottom of the part up through the part toward the top of the part) as the open frontal area is reduced.

Figure 2A:
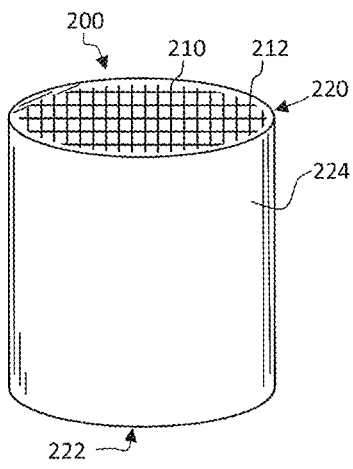
FIG. 2A shows a schematic of a cellular ceramic green body.

FIGS. 2A-2E show schematic diagrams of ceramic green bodies and exemplary embodiments of flow modulation members. FIG. 2A shows a cellular ceramic green body 200 including a plurality of intersecting porous walls 210 that form mutually adjoining cells or channels 212 extending axially between opposing end faces 220, 222. The top face 220 refers to the upper end face and the bottom face 222 refers to the lower end face of the green body 200 positioned for firing, otherwise the end faces are not limited by the orientation of the green body 200. Cell density can be between about 100 and 900 cells per square inch (cpsi). Typical cell wall thicknesses can range from about 0.025 mm to about 1.5 mm (about 1 to 60 mil). For example, cellular ceramic green body 200 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, and 900/2. As used herein, cellular ceramic green body 200 is intended to include a generally honeycomb structure but is not strictly limited to a square structure. For example, hexagonal, octagonal, triangular, rectangular or any other suitable cell shape may be used. Also, while the cross section of the cellular ceramic green body 200 is circular, it is not so limited, for example, the cross section can be elliptical or other desired shape.

According to an exemplary embodiment, at least a portion of the channels 212 at one or both of the top face 220 and the bottom face 222 may be alternately plugged (not shown) such that a channel 212 open at the top face 220 may be plugged at the bottom face 222. Likewise, a channel 212 open at the bottom face 222 may be plugged at the top face 220. In this way the fired ceramic article may serve as a wall-flow filter or a partial wall-flow filter, or a flow-through substrate where the channels 212 are not plugged. In addition, the fired ceramic article may include or support a catalyst, for example, a washcoat containing a catalyst.

The top face 220 and the bottom face 222 include an open frontal area (OFA). The open frontal area may be considered the portion of the top face 220 or bottom face 222 that is open channel 212 at the face 220/222. That is, OFA is the portion of the area of the face 220/222 excluding the cross section of the channel walls 210 at the face, excluding the cross section of the plugs at the face, if any, and excluding the cross section of a skin 224 at the face. The OFA is equal to the open frontal area of the flow channels ($A_F$) divided by the frontal area (A) of the cellular ceramic green body 200. For example, as shown in Table 1, a 400 cpsi/6.5 mil non-plugged part has an OFA of about 75.7%, and a 900 cpsi/2.5 mil non-plugged part has an OFA of about 85.6%.

TABLE 1

| part geometry | cpsi | cells/in | s, in/cell | w, wall thickness, inch | $A_F/A$ open frontal area fraction | $A_F/A$ open frontal area % |
|---|---|---|---|---|---|---|
| 400 cpsi/6.5 mil | 400 | 20 | 0.050 | 0.0065 | 0.757 | 75.7 |
| 900 cpsi/2.5 mil | 900 | 30 | 0.033 | 0.0025 | 0.856 | 85.6 |

The OFA ($A_F/A$) can be calculated by Equation 1.

$$A_F/A=(s-w)^2/s^2=(1-w/s)^2 \quad [\text{Equation 1}]$$

Where s is the cell repeat distance and the cell density, N, is equal to $1/s^2$, and w is the wall thickness.

Figure 2B:
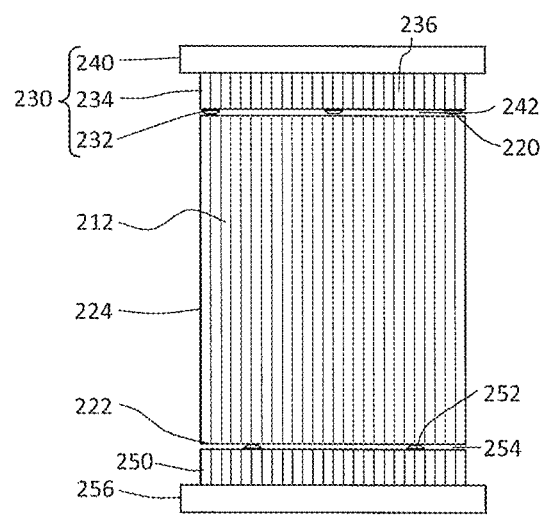
FIG. 2B shows a cross section schematic of a flow modulation member according to an exemplary embodiment of the disclosure.
Figure 2C:
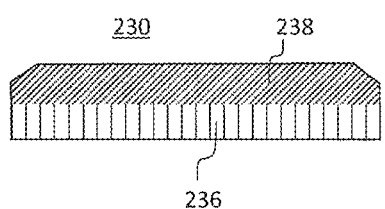
FIG. 2C shows a cross section of another exemplary embodiment of a flow modulation member.

The cellular ceramic green body 200 generally has an outer periphery or skin 224. The skin 224 may be co-extruded or applied after a contouring operation. FIG. 2B shows a schematic cross section through the cellular ceramic green body 200 of FIG. 2A positioned in the kiln and having an exemplary embodiment of a flow modulation member 230 disposed on the top face 220. The flow modulation member 230 may include a spacer foot 232, a top honeycomb 234 having honeycomb channels 236, where a portion of the honeycomb channels 236 may be closed 238 (FIG. 2C), and a top plate 240. The spacer foot 232 may provide a gap 242 between the top face 220 and the top honeycomb 234. In an alternative embodiment, the top honeycomb 234 may be disposed directly on the top face 220. In another alternative embodiment, the top honeycomb 234 may be integral with the top face 220 comprising a smeared closing of at least a portion of the channels 212 at the top face 220, for example, when the cellular ceramic green body 200 is wet or by adding wet ceramic green material. In these alternative embodiments, the spacer foot 232 may be omitted. Also, when the top honeycomb 234 is disposed directly on the top face 220, the spacer foot may be on an upper surface of the top honeycomb 234 and the top plate 240 may be directly disposed on the spacer foot 232 or the top plate 240 may be disposed directly on the upper surface of the top honeycomb 234. Also, when a portion of the honeycomb channels 236 are closed 238, including all of the honeycomb channels 236, as shown in FIG. 2C, the top plate 240 may be omitted.

Generally, the flow modulation member 230 has a surface area transverse to the channels 212. This transverse surface area of the flow modulation member 230 restricts (blocks) flow of the kiln atmosphere through the top face 220 open frontal area (OFA) of the cellular ceramic green body 200. The transverse surface area of the flow modulation member 230 may include the cross section of the honeycomb channel 236 walls, the top or bottom surface of closed 238 honeycomb channels 236 including closed channels 212 when integral with the cellular ceramic green body 200, the top or bottom surface of the top plate 240, or some combination of these surfaces. The transverse surface area of the flow modulation member 230 that restricts circulation of the atmosphere through the top face 220 of the cellular ceramic green body 200 may be equal to or greater than 10% of the top face 220 of the cellular ceramic green body 200. That is, the flow modulation member 230 may have less than 90% open flow area (frontal area). The transverse surface area may be greater than 30% of the top face 220 of the cellular ceramic green body 200. The transverse surface area may even be greater than 50% of the top face 220 of the cellular ceramic green body 200. For example, greater than 60%, greater than 70%, greater than 80%, or even greater than 90% of the top face 220 of the cellular ceramic green body 200.

According to an exemplary embodiment, the cellular ceramic green body 200 having the flow modulation member 230 disposed on the top face 220 may have a resulting OFA of less than 30%. For example, less than 25%, less than 20%, less than 15%, less than 10%, or even less than 5%.

As shown in FIG. 2B, the cellular ceramic green body having a flow modulation member 230 disposed on the top face 220 may be disposed on any suitable support such as a bottom honeycomb 250, a spacer foot 252 to provide a gap 254, and a bottom plate 256.

According to an exemplary embodiment, the flow modulation member 230 may be configured to have an area greater than 80% of the area occupied by a cross-section of the green body 200 transverse to the direction of channel 212 orientation.

The flow modulation member 230 that includes at least one of the top honeycomb 234 and the top plate 240 may be sized in a horizontal dimension to substantially match the cellular ceramic green body 200. For example, the diameter of the flow modulation member 230 may be substantially the same as the diameter of the cellular ceramic green body 200. That is, the sides of the flow modulation member 230 may coincide with the outer periphery 224 of the cellular ceramic green body 200 in a top view. Such an arrangement of coincident horizontal size may allow for the unrestricted circulation of heated oxygen-containing gases around and past the flow modulation member 230. In FIG. 2B, the top honeycomb 234 is shown as having this arrangement of coincident horizontal size with the cellular ceramic green body 200. Likewise, the top honeycomb 234 and the top plate 240 may have the same coincident size in the horizontal direction (not shown).

In an alternative embodiment, the flow modulation member 230 that includes at least one of the top honeycomb 234 and the top plate 240 may be sized in a horizontal dimension greater than or less than the cellular ceramic green body 200. For example, the top plate 240 is shown overhanging the outer periphery 224 of the cellular ceramic green body 200 in FIG. 2B. However, the top plate 240 horizontal dimensions may be less than the cellular ceramic green body 200 in alternative embodiments such that a portion of the top face 220 would be visible in a top view or a portion of the upper surface of the top honeycomb 234 would be visible in a top view.

In another embodiment, the flow modulation member 230 may include the top plate 240 spaced apart from the top face 220 of the cellular ceramic green body 200 by gap 242 with no spacer foot 232, for example, the flow modulation member 230 may comprise a shelf or ceiling shelf above the cellular ceramic green body 200.

The flow modulation member 230 that includes at least one of the top honeycomb 234 and the top plate 240 may have a porosity of less than about 70% in an exemplary embodiment. For example, the porosity may be less than 60%, less than 50%, or even less than 40%. The flow modulation member 230 may have a thickness in a range of about 0.030 inch (0.076 cm) to 4 inch (10.16 cm). In an embodiment where the flow modulation member 230 is integral with the cellular ceramic green body 200, the thickness may be approximately equal to the web (channel wall) thickness.

In some embodiments the flow modulation member is disposed directly on the green body. It has further been found that if the part is fired such that a small gap, for example, less than 1 inch (2.54 cm) exists between the top of the part and the ceiling of the kiln or shelf above the part, that the part can be fired free of cracks similar to placement of a top honeycomb or top plate in contact with the part. In fact, a beneficial condition is that the channels at the top face are not completely closed off to the kiln atmosphere. This can be achieved through use of a honeycomb top cookie containing open channels or other permeable material, or through use of an impermeable plate placed in close proximity to the top face of the part to be fired. For example, a crack-free 11"×12" cordierite part was fired in an electric kiln in which there was a very small gap (less than 1 inch (2.54 cm)) between the top of the part and the ceiling of the kiln. In some embodiments the gap may be less than or equal to 10 mm, or even less than or equal to 5 mm.

Figure 2D:
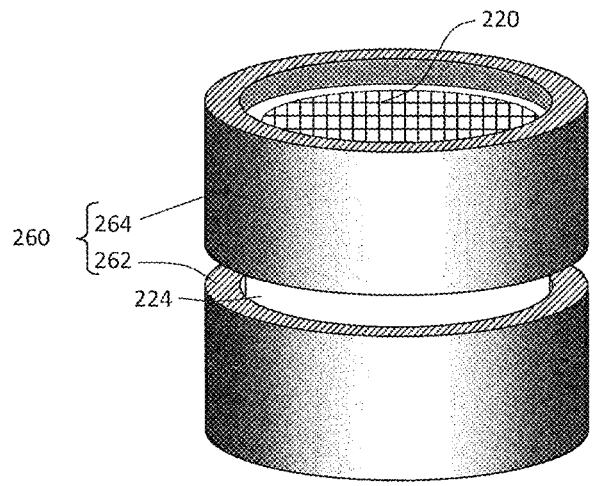
FIG. 2D shows another exemplary embodiment of a flow modulation member.
Figure 2E:
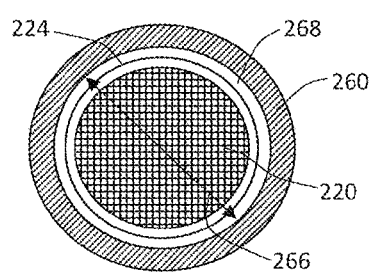
FIG. 2E shows a top view of the flow modulation member of FIG. 2D.

FIGS. 2D and 2E show another exemplary embodiment of a flow modulation member 260. The flow modulation member 260 includes a sleeve 262 to surround the outer periphery 224 of the cellular ceramic green body 200. The sleeve 262 may be shorter than or taller than the cellular ceramic green body 200, as well as the same height as the cellular ceramic green body 200. The flow modulation member 260 may include a second sleeve 264 or more (not shown) concentric and stacked with sleeve 262. The combination of sleeve 262 and second sleeve 264 may be shorter than or taller than the cellular ceramic green body 200, as well as the same height as the cellular ceramic green body 200. Also, a gap may be present between the sleeve 262 and the second sleeve 264 or the second sleeve 264 may be directly disposed on the sleeve 262.

FIG. 2E shows a top view of the flow modulation member 260 of FIG. 2D. The at least one sleeve 262, 264 forms an opening 266 to accept the cellular ceramic green body 200. The at least one sleeve 262, 264 has an outer wall (surface) and an inner wall (surface) and a thickness between the inner wall and the outer wall. The inner wall defines the opening 266 of an axial cavity open at the top and bottom of the at least one sleeve 262, 264. The inner wall of the at least one sleeve 262, 264 constituting the flow modulation member 260 may be spaced apart from the outer periphery 224 of the cellular ceramic green body 200 by a gap 268. By this disclosure it will be apparent that the opening 266 can be sized and shaped to substantially match a size and shape of a cellular ceramic green body 200 with a gap 268 between the outer periphery 224 of the cellular ceramic green body 200 and the inner wall (surface) of the at least one sleeve 262, 264.

According to further exemplary embodiments, a top honeycomb 234, a top plate 240, or both, as described above with regard to arrangement on the cellular ceramic green body 200, may be arranged on the at least one sleeve 262, 264 including the use of one or more spacer foot 232.

Figure 3A:
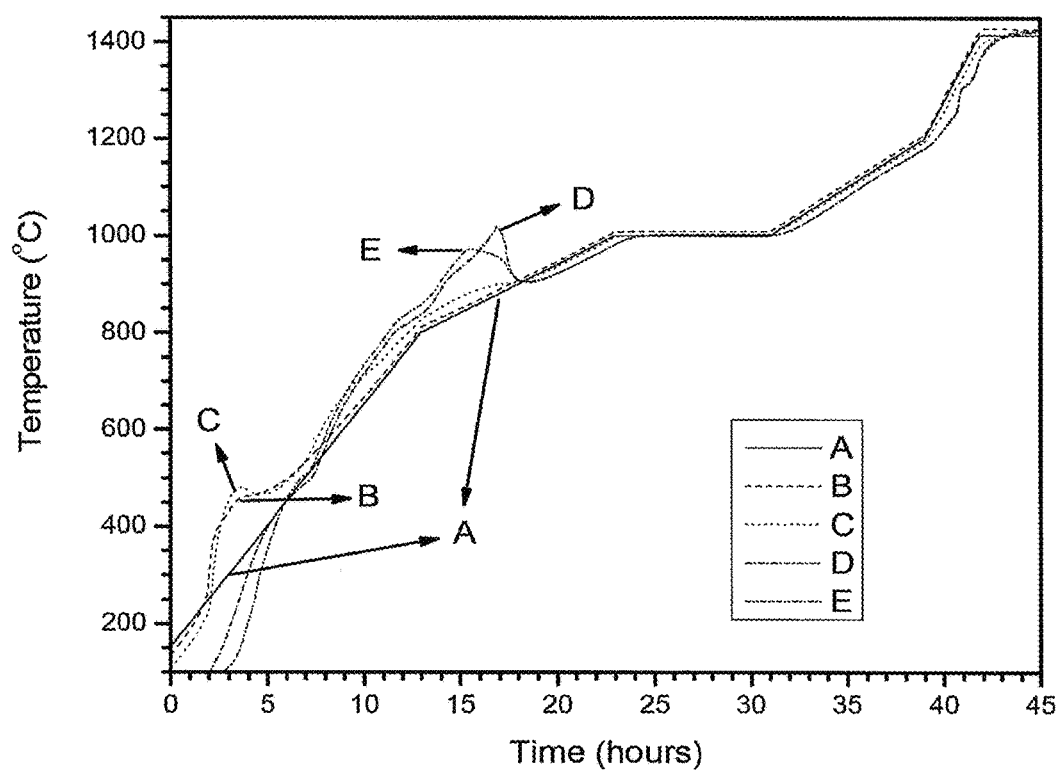
FIG. 3A is a graph of thermocouple profiles of a Comparative Example and FIG. 3B is a graph of thermocouple profiles of an Example according to an exemplary embodiment.
Figure 3B:
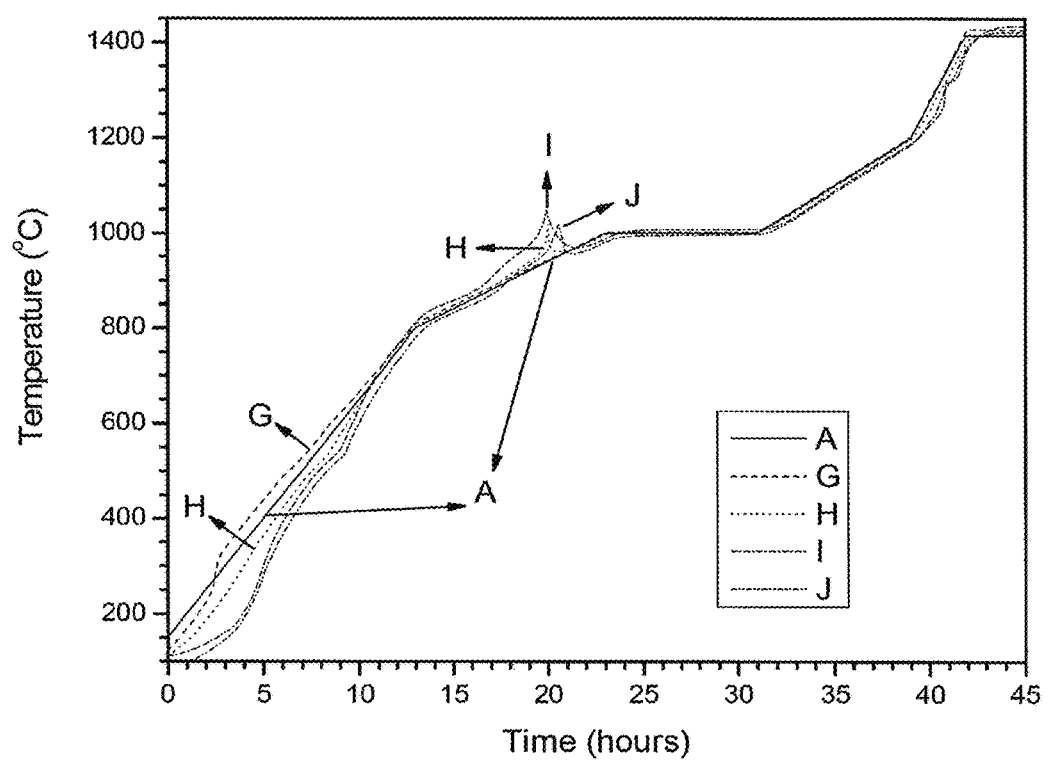

The effectiveness of exemplary embodiments of the disclosed methods and apparatus employing the flow modulation member for the debindering of cellular green bodies is further illustrated in FIGS. 3A and 3B. To confirm the burning pattern during the firing process, thermocouple profiles of an open top (comparative Example) and plate-covered top according to an exemplary embodiment are plotted in FIGS. 3A and 3B, respectively, using the same firing cycle and firing environment (12% $O_2$+88% $N_2$).

In FIG. 3A the graph of the comparative Example set up shows that top skin "B" and top core "C" temperatures quickly spike up beginning at the kiln set point temperature "A" of about 250° C., a sign that a starch burning reaction occurred with significant heat of combustion. The top skin "B" and top core "C" temperatures are 150° C. higher than the kiln set point temperature "A", then gradually cool down to reach the kiln set point "A" at 500-800° C. Meanwhile, the middle "D" and the bottom "E" of core reached the maximum temperature during the process of burn off of active carbon (black area in FIG. 1A) when kiln temperatures "A" are over 800° C.

In the top plate covered set up of the exemplary embodiment of FIG. 3B, top skin "G" and top core "H" thermocouples took two separate reaction paths. The top skin temperature "G" rose up much more slowly at kiln temperatures "A" over 275° C. This is an indication of a slow reaction process where the top skin temperature "G" is only 35° C. higher than that of kiln temperature "A" (approximately one-quarter to one-fifth of the Comparative configuration). The top core "H" thermocouple eventually follows both middle core "I" and bottom core "J". Interestingly, all three core positions "H", "I", "J" reach the peak temperature at nearly the same time. Therefore, this thermocouple data reveals a firing pattern of linear geometry in the axial direction as discussed above with reference to the photograph in FIG. 1B. It is apparent that the top covered part according to the exemplary embodiment (FIG. 3B) takes more than 3 hours longer for complete removal of the pore formers compared to that of the Comparative Example set up part (FIG. 3A) as the oxygen diffusion path (axial direction) is blocked at the top face.

Figure 4A:
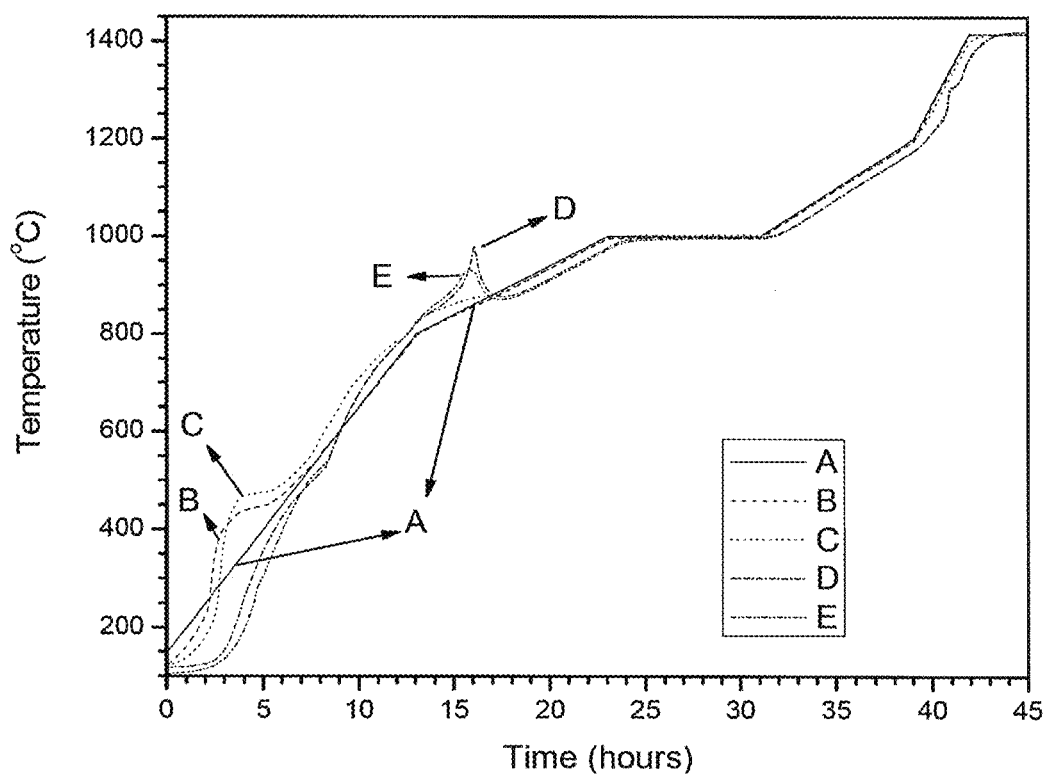
FIG. 4A is a graph of thermocouple profiles of a Comparative Example and FIG. 4B is a graph of thermocouple profiles of an Example according to an exemplary embodiment in a different firing environment than FIGS. 3A and 3B.
Figure 4B:
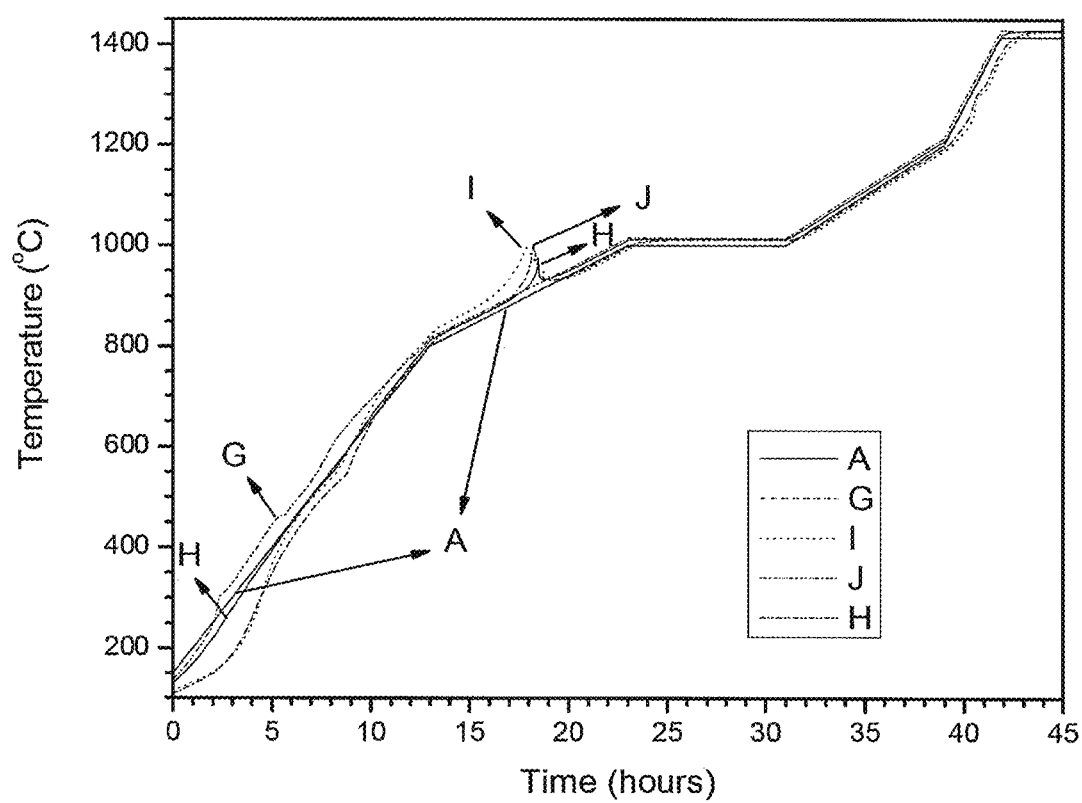

The effectiveness of exemplary embodiments of the disclosed methods and apparatus employing the flow modulation member for the debindering of cellular green bodies is further illustrated in FIGS. 4A and 4B in another environment. The impact of a top cover plate on the thermocouple profile was observed under an environment with the addition of 30% steam, i.e., 12% $O_2$+30% $H_2O$ (remainder $N_2$) in FIGS. 4A and 4B. Overall, a similar response to that seen in FIGS. 3A and 3B is observed in FIGS. 4A and 4B. However, one clear trend is that steam can reduce the maximum temperature difference (comparing FIG. 3A and FIG. 4A, and FIG. 3B with FIG. 4B and shorten the organic material (pore formers, binders, extrusion aids, etc.) pore former removal time. Therefore, steam is beneficial for both reaction kinetics (fast) and thermodynamics (less heat of combustion) for fast firing.

Figure 5:
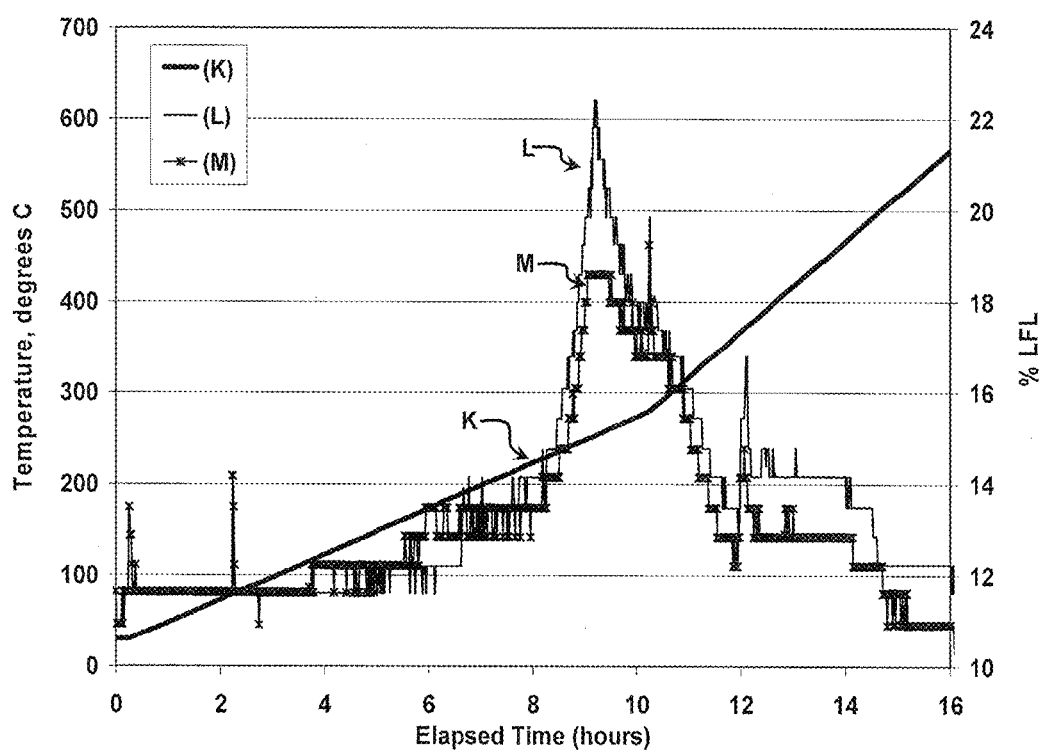
FIG. 5 illustrates lower flammability limit (LFL) change due to exemplary embodiments of the disclosure.

A further advantage of placing a top cover on the part according to exemplary embodiments of the disclosure is the reduction in peak lower flammability limit (LFL). LFL is commonly used as a way to safely operate a kiln and conditions in the kiln must be maintained below a prescribed percentage of the lower flammability limit (typically about 50%). It was unexpectedly found that the use of top covers, for example, SiC covers, reduced the peak LFL by about 35% relative to a baseline comparison firing of parts run on the same cycle without covers. FIG. 5 shows a graph of the % LFL and temperature (° C.) over cycle elapsed time (hrs). "K" represents the average kiln temperature, "L" represents the % LFL over cycle elapsed time (hrs) for the Comparative run without top covers, and "M" represents the % LFL over the cycle elapsed time (hrs) for the exemplary embodiment run having SiC top covers. The reduced peak LFL achieved by exemplary embodiments of the apparatus and method of using flow modulation members as shown in FIG. 5 demonstrates that greater load density or faster firing rates may be run without exceeding the lower flammability limit.

Embodiments of the present methods that provide wider control over related aspects of green body debindering can offer further processing advantages in specific cases. Methods wherein the cellular ceramic green bodies contain 5% or more of organic material by weight, or even 5-15% of organic material by weight are representative.

Examples of embodiments well adapted for such use include those wherein debindering is carried out in an oxygen-containing atmosphere that comprises less than 20% oxygen by volume, for example wherein debindering is carried out in an oxygen-containing atmosphere containing about 13-19% oxygen by volume.

The debindering of large cellular ceramic green bodies comprising cordierite precursor powders can involve a problem not encountered during the debindering of green bodies composed of other materials, in that cordierite precursor bodies typically comprise a hydrated clay constituent. The consequence of including clay in the precursor mixture is that the step of heating the green bodies then comprises both an exothermic organics burnout phase and an endothermic clay dehydroxylation phase, with the possibility of overlapping the exothermic and endothermic events producing larger internal thermal stresses than are encountered during binder burnout alone. In order to avoid problems from combined stresses, therefore, embodiments of the disclosed methods wherein the step of heating is carried out at a heating rate effective to substantially complete the binder burnout phase prior to initiating the clay dehydroxylation phase can be advantageously employed.

Apparatus such as presently used for the debindering of green cellular ceramic bodies can be adapted for use in the practice of the above disclosed methods. Such apparatus can include dedicated debindering ovens as well as large periodic or tunnel kilns that can carry out debindering and then reaction-sintering in sequential fashion. For example, kilns may be used such as described in commonly owned U.S. patent application Ser. No. 12/627,000, filed on Nov. 30, 2012, the entire contents of which are hereby incorporated by reference as if fully set forth herein.

Experiments were run in which 11 inch wide×13 inch length (27.94×33.02 cm) parts containing a 30% super addition of corn starch pore former were fired at 3% $O_2$ up to 600° C. and then ramped to 10% between 600° C. and 700° C. The parts were then fired to approximately 1400° C. and cooled. A Comparative Example and three Examples according to exemplary embodiments of the disclosure were evaluated. In the Comparative Example, no top cover was used on the cellular ceramic green body. In the first Example according to an exemplary embodiment of the disclosure, a green honeycomb of thickness of 1.25 inch (3.18 cm) was placed on the top face of the cellular ceramic green body. In the second Example according to an exemplary embodiment of the disclosure, a fired honeycomb with half the channels plugged was placed on the top face of the cellular ceramic green body. In the third Example according to an exemplary embodiment of the disclosure, a solid SiC plate was placed on the top face of the cellular ceramic green body.

The Comparative Example part without any top cover experienced the most severe face cracking. The second and third Example parts with the fired honeycomb and the SiC cover, respectively, both showed face cracks, but at a lesser severity than that observed for the Comparative Example part with no cover. Finally, the first Example part with the green honeycomb showed no cracks. The presence of pore former in the green honeycomb cover of the first Example may have been more effective at allowing for matching conditions in the top face of the cellular ceramic green body than the covers without organic materials in the second and third Examples.

A second Comparative Example and fourth exemplary Example were run in a furnace (kiln) without $O_2$ control (having about 20% $O_2$ in furnace atmosphere) with 11×13 inch (27.94×33.02 cm) parts in 200/8 geometry (200 cells per square inch (cpsi) having cell wall thickness of 8 mils) with a composition that contained 25% walnut shell flour as the pore former. The impact of the flow modulation member on face cracking was significant. The second Comparative Example cellular ceramic green body without a top honeycomb exhibited severe face cracking, and the fourth exemplary Example cellular ceramic green body with a top honeycomb showed no face cracks.

Exemplary embodiments of the sleeve flow modulation members were constructed from 8 inch (20.32 cm) diameter green honeycombs. The cores were removed (drilled) from the honeycombs to form a substantially centered 6 inch (15.24 cm) diameter axial cavity within the honeycombs. First sleeve Experiments were conducted where 5.66 inch (14.38 cm) diameter cordierite cellular ceramic green bodies were placed within the core drilled cavities, and the parts were fired in a kiln without $O_2$ control (having about 20% $O_2$ in furnace atmosphere) alongside a third Comparative Example cellular ceramic green body control part of 5.66 inch (14.38 cm) diameter cordierite composition left exposed to the kiln atmosphere. Note that the core drilled honeycombs (sleeves) were of a different composition than the third Comparative Example and the Example cellular ceramic green bodies within the sleeves. After firing, it was found that the Example parts disposed within the sleeves during firing were less severely cracked than the third Comparative Example control part. In this exemplary embodiment of firing Example cellular ceramic green bodies, the Example parts and the sleeves were of different composition. The sleeve material comprised fired cordierite. It was noted that the parts fired in the sleeves exhibited substantially fewer cracks compared to parts fired without sleeves. According to exemplary examples, sleeve thicknesses of 1 inch (2.54 cm) and 2 inch (5.08 cm) were successfully used, but the disclosure is not limited to these embodiments.

After the first sleeve Experiments, a second set of sleeve Experiments were conducted where cellular ceramic green cordierite bodies were placed within the fired sleeves from the first sleeve Experiments and fired. It was again found that the crack severity was substantially reduced compared to co-fired Comparative Examples. A third set of sleeve Experiments was conducted where the fired sleeve was impregnated with organic material, for example, by dipping in a solution of methylcellulose or starch. This allowed for $O_2$ control at the interface similar to what occurred with a green sleeve, but this would allow the sleeve to be re-used multiple times.

A fourth sleeve Experiment was carried out with automotive substrates that are susceptible to fissure cracking in the skin. Green cordierite parts were inserted into cordierite sleeves of the same composition. Since the height of the cellular ceramic green bodies to be inserted was greater than that of the individual sleeve parts, two sleeve parts were stacked together (see FIG. 2D). A marked decrease in crack severity was noted on the parts fired in the green sleeves according to the exemplary embodiment as compared to co-fired Comparative Examples.

According to exemplary embodiments of the disclosure, the flow modulation member can provide the benefit of higher steam and low oxygen reaction conditions at the reaction sites where cracks typically form inside the parts, from which part of the benefits of mixing gas ($H_2O+O_2$) at kiln atmosphere level can be achieved at part-level locally.

Exemplary embodiments of the disclosure also provide thermodynamics on the flow modulation member, which include cover honeycombs, plates or sleeves, to provide a higher level of steam and lower $O_2$ level locally that reduces the total heat of combustion from oxidation reactions, reducing the temperature difference and improving the yield of the ceramic bodies.

Exemplary embodiments of the disclosure also provide low cost manufacturing, for example by disposing a flow restriction member on top of the cellular bodies during firing. The flow restriction member could be a green or fired honeycomb (scrap or new), or a plate placed on or slightly above the honeycomb according to exemplary embodiments.

Exemplary embodiments of the disclosure also provide reaction kinetics modification to decrease the oxygen concentration at ignition sites and enhance the local steam concentration, thus, reducing the risk of fast lighting and improving the yield of ceramics. Exemplary embodiments of the disclosure also provide a modified diffusion process to restrict the flow of oxygen from the bottom to the top of parts to reduce the overall oxygen flow rate and increase the relative concentration of production gas of steam, creating a micro steam environment inside the parts to improve the yield of ceramics.

Exemplary embodiments of the disclosure also provide a physical impact to change the burning pattern and force the reaction to progress inward only from the skin (outer periphery) rather than inward from the skin and downward from the top face at the same time. Therefore, a cylindrical burning pattern from the skin to inside the part leads to a symmetrical stress distribution with less internal or interfacial stress concentration for better part survivability. Exemplary embodiments of the disclosure also provide higher levels of steam in dehydration reaction of minerals. Many ceramics sintering processes involve the loss of water from minerals (clay, talc, etc.), these reactions under the higher local steam concentration will be smoothed out during the firing process for better part yield.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of, materials, coatings, channel and filter geometry, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The methods described above are generally set forth as logical flow. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Additionally, the order in which a particular method occurs may or may not strictly adhere to the order of the corresponding steps shown.

It will be apparent to those skilled in the art that various modifications and variations can be made to the described embodiments without departing from the spirit or scope of the claimed invention. Thus, it is intended that the claims cover the modifications and variations of the embodiments provided they come within the scope of the appended claims and their equivalents.

What is claimed is:

1. A method for debindering a cellular ceramic green body comprising a top face and a bottom face with axial honeycomb channels extending therebetween, the method comprising:
   heating the green body in a circulating oxygen-containing atmosphere; and
   selectively restricting circulation of the circulating oxygen-containing atmosphere to the green body with a flow modulation sleeve around a side of the cellular ceramic green body;
   wherein the sleeve comprises a honeycomb body having a cavity into which the cellular ceramic green body can be placed.

2. The method of claim 1 wherein the sleeve surrounds an outer periphery of the cellular ceramic green body.

3. The method of claim 2 wherein the sleeve is spaced apart from the outer periphery of the cellular ceramic green body.

4. The method of claim 1 wherein the sleeve is comprised of cordierite.

5. The method of claim 1, wherein the heating is performed while supporting the cellular ceramic green body on a horizontal support surface and wherein the sleeve blocks the circulating oxygen-containing atmosphere flow to an outer peripheral side of the cellular ceramic green body.

6. The method of claim 5 wherein the sleeve surrounds the outer peripheral side of the cellular ceramic green body.

7. The method of claim 6 wherein the sleeve is spaced apart from the outer peripheral side of the cellular ceramic green body.

8. The method of claim 5 wherein the sleeve is comprised of cordierite.

9. The method of claim 5 wherein the sleeve comprises organic material.

10. A method for debindering a cellular ceramic green body comprising a top face and a bottom face with axial honeycomb channels extending therebetween, the method comprising:
    heating the green body in a circulating oxygen-containing atmosphere; and
    selectively restricting circulation of the circulating oxygen-containing atmosphere to the green body with a flow modulation sleeve around a side of the cellular ceramic green body;
    wherein the sleeve comprises organic material.

* * * * *